US008598513B2

(12) United States Patent
Gilbert et al.

(10) Patent No.: US 8,598,513 B2
(45) Date of Patent: Dec. 3, 2013

(54) MASS SPECTROMETER

(75) Inventors: Anthony James Gilbert, High Peak (GB); Martin Green, Cheshire (GB)

(73) Assignee: Micromass UK Limited, Manchester (GB)

( * ) Notice: Subject to any disclaimer, the term of this patent is extended or adjusted under 35 U.S.C. 154(b) by 699 days.

(21) Appl. No.: 12/600,209

(22) PCT Filed: May 14, 2008

(86) PCT No.: PCT/GB2008/001663
§ 371 (c)(1),
(2), (4) Date: Nov. 4, 2010

(87) PCT Pub. No.: WO2008/139193
PCT Pub. Date: Nov. 20, 2008

(65) Prior Publication Data
US 2011/0049353 A1    Mar. 3, 2011

Related U.S. Application Data

(60) Provisional application No. 60/940,494, filed on May 29, 2007.

(30) Foreign Application Priority Data

May 15, 2007    (GB) .................................. 0709312.3

(51) Int. Cl.
H01J 49/00    (2006.01)
(52) U.S. Cl.
CPC ............. *H01J 49/0036* (2013.01); *H01J 49/00* (2013.01)

USPC ................ 250/282; 250/287; 702/23; 702/85
(58) Field of Classification Search
CPC ........................................................ H01J 49/00
USPC ................................. 250/282, 287; 702/23, 85
See application file for complete search history.

(56) References Cited

U.S. PATENT DOCUMENTS

| 6,680,476 B1 | 1/2004 | Hidalgo et al. |
| 2003/0114993 A1 | 6/2003 | Brekenfeld |
| 2011/0071764 A1* | 3/2011 | Prather et al. ................ 702/19 |
| 2011/0303837 A1* | 12/2011 | Prather et al. ................ 250/282 |

FOREIGN PATENT DOCUMENTS

| GB | 2409568 | 6/2005 |
| GB | 2385982 | 10/2007 |
| JP | 2006236795 | 6/2011 |
| WO | 2008/049038 | 4/2008 |

OTHER PUBLICATIONS

Notification of Reason for Rejection for Patent Application No. 2010-507972, dated Jun. 14, 2011.

* cited by examiner

*Primary Examiner* — Jack Berman
(74) *Attorney, Agent, or Firm* — Diederiks & Whitelaw, PLC

(57) ABSTRACT

A mass spectrometer is disclosed wherein a signal output from an ion detector is digitised using an Analogue to Digital Converter. A background or baseline level is dynamically subtracted from the digitised signal whilst the time of flight data is still being acquired. A threshold is also applied dynamically to the digitised signal in order to reduce electronic noise.

18 Claims, 5 Drawing Sheets

MASS SPECTROMETER

CROSS REFERENCE TO RELATED APPLICATIONS

This application is the National Stage of International Application No. PCT/GB2008/001663, filed May 14, 2008, which claims priority to and benefit of United Kingdom Patent Application No.0709312.3, filed May 15, 2007, and U.S. Provisional Patent Application Ser. No. 60/940,494 filed May 29, 2007. The entire contents of these applications are incorporated herein by reference.

The present invention relates to an ion detector system, a mass spectrometer, a method of detecting ions and a method of mass spectrometry. The preferred embodiment relates to a method of dynamically subtracting a changing baseline value from an ion detector signal during acquisition of time of flight or mass spectral data.

It is known to use Time to Digital Converters (TDC) and Analogue to Digital Converters (ADC) as part of data recording electronics for many analytical instruments including Time of Flight mass spectrometers.

Time of Flight mass spectrometers are known which incorporate a Time to Digital Converter wherein signals resulting from ions arriving at an ion detector which satisfy defined detection criteria are recorded as single binary values associated with a particular arrival time relative to a trigger event. A fixed amplitude threshold may be used to trigger recording of an ion arrival event. Time of flight data corresponding to ion arrival events are combined to form a histogram of ion arrival events which is then presented as a time of flight spectrum for further processing. Time to Digital Converters have the advantage of being able to detect relatively weak signals but their use is limited to situations wherein the probability of multiple ions arriving in close temporal proximity remains relatively low.

Once an ion arrival event has been recorded using a Time to Digital Converter then there is a significant time delay or dead-time period following the ion arrival event during which time no further ion arrival events can be recorded by the ion detector. At high signal intensities, therefore, dead-time effects will result in the failure of some ion arrival events from being recorded. This will result in an inaccurate representation of the signal intensity and will also result in an inaccurate measurement of the ion arrival time. These effects will adversely limit the effective dynamic range of the ion detector system.

Time of Flight mass spectrometers incorporating Analogue to Digital Converters are known wherein signals resulting from ions arriving at an ion detector are digitised relative to a trigger event. Digitised signals from subsequent trigger events are summed or averaged to produce a time of flight spectrum for further processing. One particular known signal averager is capable of digitising the signal output from an ion detector at a frequency of 3-4 GHz with eight or ten bit intensity resolution.

The use of an Analogue to Digital Converter allows multiple ion arrivals to be recorded in situations where the signal intensity may be relatively high without the ion detector suffering from problems due to distortion. However, the detection of low intensity signals is generally limited by electronic noise from the digitiser electronics, the ion detector and the associated amplifier. The electronic noise limits the effective dynamic range of the ion detector system.

Ion detector systems are known which attempt to use a combination of a Time to Digital Converter and an Analogue to Digital Converter. Such ion detector systems seek to exploit the advantage of the different characteristics of each type of recording device with a view to increasing the overall dynamic range. However, a combined Time to Digital Converter and Analogue to Digital Converter ion detector system is relatively expensive and the resulting detector electronics is relatively complex to calibrate and operate.

It is known to attempt to increase the dynamic range of an Analogue to Digital Converter ion detection system by imposing a DC offset or fixed firmware threshold on or to the digitised data from each trigger event. As a result, only digitised signals which exceed a threshold intensity value are subsequently recorded. This method effectively removes analogue noise prior to summing of data thereby improving detection limits. However, the known approach does not recognise or seek to address the problem of short and long term variations in the level of the DC baseline recorded.

Changes in the DC level may result from a variety of different factors including thermal drift of components within the recording electronics or signal amplification electronics as a result of changes in the ambient temperature.

Another factor which influences changes in the DC level is that the output of an ion detection device, such as an electron multiplier or micro-channel plate (MCP) detector, is typically at a relatively high voltage. As a result, capacitive coupling, inductive coupling or other forms of AC coupling may be employed to allow subsequent amplifiers and recording devices to operate at or close to ground potential. Fast AC amplifiers may be employed, for example, to maintain the analogue pulse widths prior to digitisation. However, the use of AC coupled electronics can cause short and long term changes in the baseline level related to the local signal magnitude, the total magnitude of the signal produced for a single trigger event and the time constant associated with the capacitance of the circuit.

If a fixed threshold is employed to reduce the contribution of analogue noise, then any baseline drift relative to the threshold may result in either the noise level drifting above the threshold or the signal intensity dropping below the threshold. Either situation will result in an undesirable distortion of the recorded signal. These effects are also observed when using a Time to Digital Converter with a fixed event-counting threshold.

A Time of Flight mass spectrometer is known wherein the output signal from an ion detector is digitised by an Analogue to Digital Converter (ADC). A processor connected to the Analogue to Digital Converter determines a baseline value and a threshold value and assigns the baseline value to the portions of the analogue signal at or below the threshold value. The Analogue to Digital Converter system is arranged so that if the analogue signal is greater than the threshold value, the Analogue to Digital Converter system records an intensity representing the analogue signal intensity.

According to the known approach, signal which is below the calculated threshold will be set to the calculated baseline value. Signal above the threshold is left unchanged i.e. it is set to the intensity of the analogue signal. Any underlying DC variation within or between individual time of flight spectra will still be present in the final data prior to summing or averaging. In a system which employs AC coupling as part of the detection or amplification electronics, short and long-term variations in the value of the baseline will be dependent upon the magnitude of the ion signal arriving at the ion detector. For non-repetitive signals, such as those generated in time of flight mass spectrometry, the baseline value will vary within each time of flight spectrum and between consecutive time of flight spectra. These different baselines will be summed or averaged in the final output.

Failure to account for the baseline offset and baseline variation prior to subsequent processing will cause errors in the subsequent data analysis. For example, if a threshold level is applied to the data then truncation of the signal will lead to loss of data and inaccurate area determination. The data may include variable amounts of baseline offset in peak integration which will distort quantitative measurements and may give rise to the assumed detection of false peaks.

If the baseline value is set to zero regardless of the actual offset then there may be large errors in the apparent magnitude of the signals recorded which will also lead to quantitative errors in the final data.

It is important to note that the known or conventional approach is to calculate the baseline value at the end of each time of flight record length i.e. as a post-processing step after acquisition of the time of flight data. A threshold is then calculated relative to the baseline for each point within the digitised signal to allow for rejection of analogue noise without rejection of digitised signal. Such an approach is computationally intensive and is problematic when operating at high spectral rates. Conventional orthogonal acceleration Time of Flight mass spectrometers may, for example, operate at speeds wherein individual time of flight spectra are acquired at a rate of between 10,000 and 100,000 spectra per second. Each spectrum must be processed and summed or averaged without data losses and it will be apparent that this is a non-trivial problem.

It is desired to provide an improved mass spectrometer and method of mass spectrometry.

According to an aspect of the present invention there is provided a method of detecting ions comprising:

digitising a first signal which is being output by an ion detector to produce a plurality of corresponding first signal values;

dynamically determining the background or baseline level of the first signal or the first signal values by determining a median or another function of the first signal or the first signal values during a prior time period t1; and dynamically subtracting the background or baseline level of the first signal or the first signal values from the first signal or the first signal values to produce a plurality of second signal values.

The dynamic determination and subtraction of the estimated DC background level preferably results in improved ion spectra which do not suffer from distortions due to, for example, AC coupling effects. The speed and quality of the data is also significantly improved.

The median of the first signal or the first signal values preferably comprises the 50% percentile of the first signal or the first signal values. The other function of the first signal or the first signal values preferably comprises another percentile (other than 50%) of the first signal or the first signal values. For example, the other function may comprise the 40%, 45%, 48%, 52%, 55% or 60% percentile of the first signal or the first signal values. Less preferred embodiments are contemplated wherein the other function may comprise a determination of the average or another function other than a fixed percentile of the first signal or first signal values.

The step of digitising the first signal preferably comprises using an Analogue to Digital Converter (ADC) to digitise the first signal. The Analogue to Digital Converter is preferably operated, in use, at a digitisation rate selected from the group consisting of: (i) <1 GHz; (ii) 1-2 GHz; (iii) 2-3 GHz; (iv) 3-4 GHz; (v) 4-5 GHz; (vi) 5-6 GHz; (vii) 6-7 GHz; (viii) 7-8 GHz; (ix) 8-9 GHz; (x) 9-10 GHz; and (xi) >10 GHz.

The Analogue to Digital Converter preferably comprises a resolution selected from the group consisting of: (i) at least 4 bits; (ii) at least 5 bits; (iii) at least 6 bits; (iv) at least 7 bits; (v) at least 8 bits; (vi) at least 9 bits; (vii) at least 10 bits; (viii) at least 11 bits; (ix) at least 12 bits; (x) at least 13 bits; (xi) at least 14 bits; (xii) at least 15 bits; and (xiii) at least 16 bits.

The step of dynamically determining the background or baseline level of the first signal or the first signal values preferably comprises:

(a) dynamically determining the background or baseline level during acquisition of time of flight data and/or mass spectral data; and/or (b) dynamically determining the background or baseline level for a first signal which is being produced due to a group of ions during a time period after the group of ions have been accelerated into a time of flight or drift region of a Time of Flight mass analyser and prior to all of the ions in the group arriving at an ion detector; and/or (c) dynamically determining the background or baseline level in real-time whilst a set of time of flight data and/or mass spectral data relating to a group of ions is still being acquired and not as a post-processing step after a set of time of flight data and/or mass spectral data relating to the group of ions has been fully acquired.

The step of determining another function of the first signal or the first signal values preferably comprises determining a percentile of the first signal or the first signal values during the prior time period t1. The percentile preferably falls within a range selected from the group consisting of: (i) <10%; (ii) 10-20%; (iii) 20-30%; (iv) 30-40%; (v) 40-50%; (vi) 50-60%; (vii) 60-70%; (viii) 70-80%; (ix) 80-90%; and (x) >90%. A percentile in the range 40-60% is particularly preferred.

The step of determining a median or another function of the first signal or the first signal values during a prior time period t1 preferably further comprises determining whether the first signal or the first signal value is greater than or less than the current determined median or another function of the first signal or the first signal values.

If the first signal or the first signal value is greater than the current determined median or another function of the first signal or the first signal values then a first constant value is preferably added to the determined median or another function. If the first signal or the first signal value is less than the current determined median or another function of the first signal or the first signal values then a second constant value is preferably subtracted from the determined median or another function.

The first constant value is preferably substantially the same as the second constant value. Alternatively, the first and second constant values may be substantially different.

The step of dynamically determining the background or baseline level of the first signal or the first signal values may according to an embodiment comprise providing a first baseline value register and/or a second baseline fraction register. If the first signal or the first signal value is greater than the value stored in the first baseline value register then an integer value is preferably added to the value stored in the second baseline fraction register. If the first signal or the first signal value is less than the value stored in the first baseline value register then an integer value is preferably subtracted from the value stored in the second baseline fraction register.

According to the preferred embodiment during acquisition of a single set of time of flight or mass spectral data corresponding to a single group of ions which are accelerated into a time of flight or drift region of a Time of Flight mass analyser, at least x first signal values or data values are preferably obtained over a time period T, wherein x is preferably selected from the group consisting of: (i) <1000; (ii) 1000-5000; (ii) 5000-10000; (iii) 10000-50000; (iv) 50000-

100000; (v) 100000-500000; (vi) 500000-1000000; and (vii) >1000000. The prior time period t1 preferably corresponds to a time during which y first signal values or data values are obtained, wherein y is preferably selected from the group consisting of: (i) <10; (ii) 10-50; (iii) 50-100; (iv) 100-500; (v) 500-1000; (vi) 1000-5000; (vii) 5000-10000; (viii) 10000-50000; and (ix) >50000.

According to the preferred embodiment a single set of time of flight or mass spectral data which preferably corresponds to a single group of ions which are accelerated into a time of flight or drift region of a Time of Flight mass analyser is preferably acquired over a time period T which is preferably selected from the group consisting of: (i) <500 ns; (ii) 500-1000 ns; (iii) 1-5 µs; (iv) 5-10 µs; (v) 10-50 µs; (vi) 50-100 µs; (vii) 100-500 µs; (viii) 500-1000 µs; and (ix) >1 ms. The prior time period t1 is preferably selected from the group consisting of: (i) <5 ns; (ii) 5-10 ns; (iii) 10-50 ns; (iv) 50-100 ns; (v) 100-500 ns; (vi) 500-1000 ns; (vii) 1-5 µs; (viii) 5-10 µs; (ix) 10-50 µs; (x) 50-100 µs; (xi) 100-500 µs; (xii) 500-1000 µs; and (xiii) >1 ms.

The ratio of the prior time period t1 to the time period T is preferably selected from the group consisting: (i) ≤50%; (ii) ≤10%; (iii) ≤5%; (iv) ≤1; (v) ≤0.5%; (vi) ≤0.1%; (vii) ≤0.05%; (viii) ≤0.01%; (ix) ≤0.005%; (x) ≤0.001%; (xi) ≤0.0005%; (xii) ≤0.0001%; (xiii) ≤0.00005%; and (xiv) ≤0.00001%.

An important further aspect of the preferred embodiment comprises comparing the second signal values with a threshold value. According to the preferred embodiment if a second signal value falls below the threshold value then the second signal value is preferably assigned a value of zero or is otherwise substantially reduced. If a second signal value falls above or exceeds the threshold value then the second signal value is preferably left substantially unaltered (or according to a less preferred embodiment is reduced by only a relatively small amount).

The step of comparing the second signal values with a threshold value preferably comprises:

(a) dynamically comparing the second signal values with the threshold value during acquisition of time of flight data and/or mass spectral data; and/or (b) dynamically comparing the second signal values with the threshold value wherein the second signal values correspond with a first signal which is being produced due to a group of ions during a time period after the group of ions have been accelerated into a time of flight or drift region of a Time of Flight mass analyser and prior to all of the ions in the group arriving at an ion detector; and/or (c) dynamically comparing the second signal values with the threshold value in real-time whilst a set of time of flight data and/or mass spectral data relating to a group of ions is still being acquired and not as a post-processing step after a set of time of flight data and/or mass spectral data relating to the group of ions has been fully acquired.

According to another aspect of the present invention there is provided a method of mass spectrometry comprising a method as described above.

According to another aspect of the present invention there is provided an ion detector system comprising:

a device arranged and adapted to digitise a first signal which is being output by an ion detector to produce a plurality of corresponding first signal values;

a device arranged and adapted to dynamically determine the background or baseline level of the first signal or the first signal values by determining a median or another function of the first signal or the first signal values during a prior time period t1; and a device arranged and adapted to dynamically subtract the background or baseline level of the first signal or the first signal values from the first signal or the first signal values to produce a plurality of second signal values.

According to another aspect of the present invention there is provided a mass spectrometer further comprising an ion detector system as described above.

The mass spectrometer preferably further comprises either:

(a) an ion source arranged upstream of the ion detector system, wherein the ion source is selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; and (xviii) a Thermospray ion source; and/or (b) one or more ion guides arranged upstream of the ion detector system; and/or (c) one or more ion mobility separation devices and/or one or more Field Asymmetric Ion Mobility Spectrometer devices arranged upstream of the ion detector system; and/or (d) one or more ion traps or ion trapping regions arranged upstream of the ion detector system; and/or (e) one or more collision, fragmentation or reaction cells arranged upstream of the ion detector system, wherein the one or more collision, fragmentation or reaction cells are selected from the group consisting of: (i) a Collisional Induced Dissociation ("CID") fragmentation device; (ii) a Surface Induced Dissociation ("SID") fragmentation device; (iii) an Electron Transfer Dissociation fragmentation device; (iv) an Electron Capture Dissociation fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an ion-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions, to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; and (xxviii) an ion-metastable atom reaction device for reacting ions to form adduct or product ions; and/or (f) a mass analyser selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic or orbitrap mass analyser; (x) a Fourier Transform electrostatic or orbitrap mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser.

According to another aspect of the present invention there is provided a method of mass spectrometry comprising:

dynamically determining a median or other percentile of a first signal output from an ion detector over a prior time period;

dynamically subtracting the median or other percentile from the first signal to generate a second signal; and dynamically applying a threshold to the second signal and setting second signal values to zero (or close to zero) if the second signal does not substantially exceed the threshold.

According to another aspect of the present invention there is provided a mass spectrometer comprising:

a device for dynamically determining a median or other percentile of a first signal output from an ion detector over a prior time period;

a device for dynamically subtracting the median or other percentile from the first signal to generate a second signal; and a device for dynamically applying a threshold to the second signal and setting second signal values to zero (or close to zero) if the second signal does not substantially exceed the threshold.

According to the preferred embodiment there is provided a mass spectrometer which preferably produces an output signal derived from the arrival of ions at an ion detector. The output signal preferably varies in intensity or magnitude with time. According to the preferred embodiment a value corresponding to the baseline for the output signal is preferably repetitively determined at frequent intervals in time during the acquisition of data (e.g. time of flight or mass spectral data). The baseline value is preferably repetitively subtracted from the output signal at frequent and/or substantially regular intervals in time during actual acquisition of the data and not as a post-processing step once a data set has been acquired.

According to the preferred embodiment, the output signal from the ion detector is preferably digitised using an Analogue to Digital Converter (ADC) which is preferably arranged to sample the output signal at a relatively high frequency.

The baseline value which is preferably subtracted at any particular time during an acquisition is preferably determined by interrogation of the output signal over a relatively short period of time (relative to the total acquisition period of a single data set) and which is preferably immediately prior or otherwise prior to the particular time.

According to an embodiment, the resulting signal, after subtraction of the baseline value from the output signal, may be further set to zero in real time if the resulting signal falls below a pre-defined threshold value.

The mass spectrometer preferably comprises a Time of Flight mass spectrometer such as an orthogonal acceleration Time of Flight mass spectrometer. However, the mass spectrometer may according to other less preferred embodiments comprise other types of mass spectrometer which provide an output signal that varies in magnitude with time. For example, the mass spectrometer may comprise a quadrupole mass filter, a linear quadrupole ion trap, a 3D quadrupole ion trap or a magnetic sector mass spectrometer.

Dynamic subtraction of a calculated baseline value from the ion signal preferably results in spectra which exhibit substantially no variation in the baseline level other than for very short term baseline noise. Any remaining baseline noise is preferably set to zero throughout the spectra. Spectra may be summed directly or may initially be processed using a fixed threshold or alternative peak detection method prior to summing or averaging. The additional processing may involve a peak detection or location routine.

The preferred embodiment preferably significantly improves the speed and the quality of final time of flight spectra or mass spectra as compared to spectra obtained conventionally. Variations in the baseline which occur within a single acquisition time are preferably significantly reduced or otherwise substantially removed from each spectra and hence from any final summed or averaged data. This preferably enables easier and more accurate location and identification of areas of interest within the data. Removal of the varying baseline also significantly improves the accuracy of quantitation of ion signals within the data.

Various embodiments of the present invention together with other arrangements given for illustrative purposes only will now be described, by way of example only, and with reference to the accompanying drawings in which.

Figure 1:
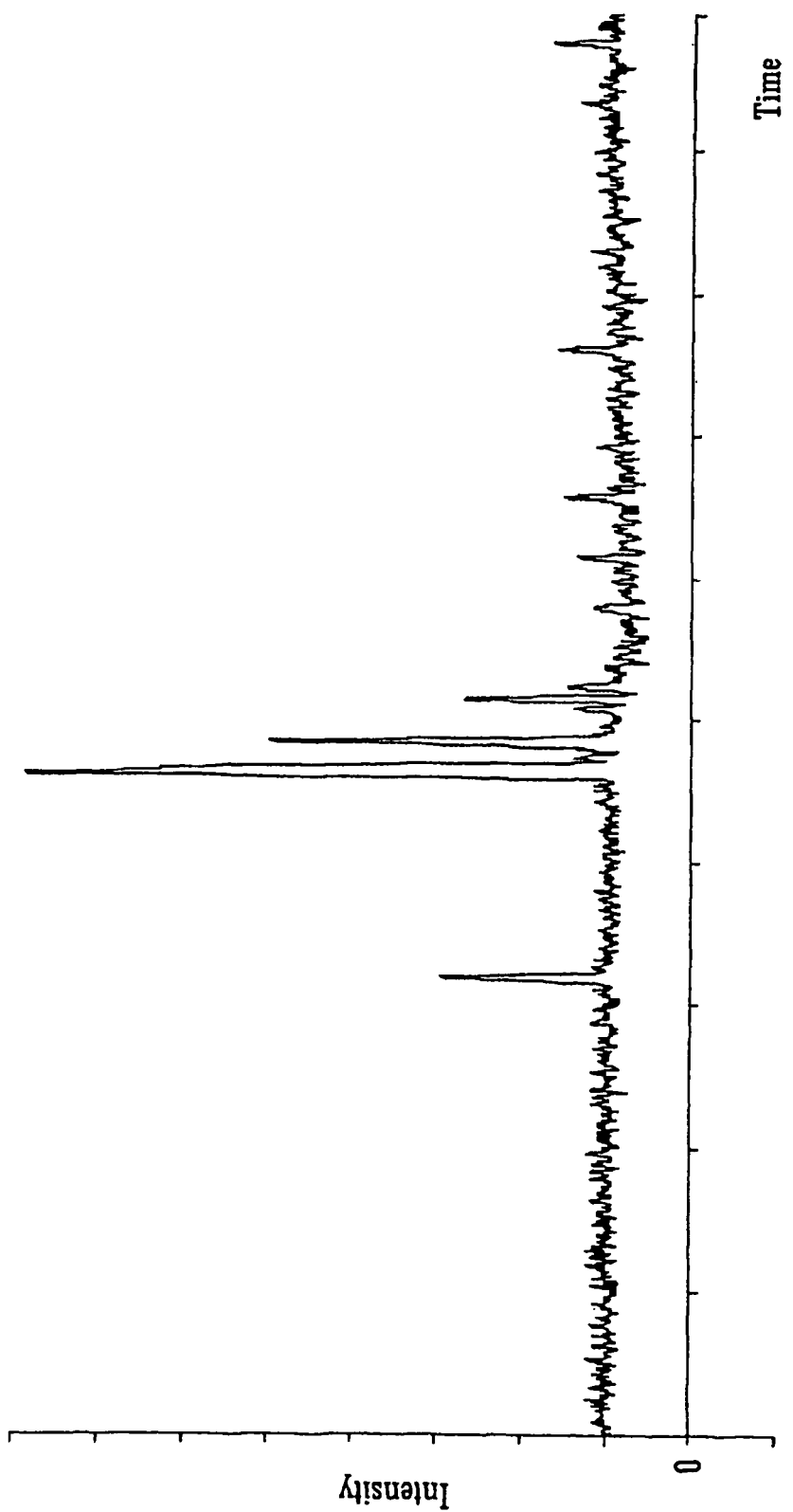
FIG. 1 shows a single digitised time of flight spectrum.

A preferred embodiment of the present invention will now be described with reference to FIG. 1. FIG. 1 shows a portion of a single time of flight spectrum which was obtained by mass analyzing the $[M+6H]^{6+}$ isotope cluster from a sample of Bovine insulin. The ions shown in FIG. 1 were measured as having a flight time of approximately 42 μs. The sample was ionized by Electrospray ionisation and positive ions were analyzed using an orthogonal acceleration Time of Flight mass spectrometer or mass analyser. The ions were detected using a micro-channel plate ion detector. Secondary electrons generated by the high energy analyte ions were subsequently amplified and the subsequent electron current was capacitively coupled to ground potential. The electric current was then amplified using a current to voltage converter and was digitised at a frequency of 5 GHz using an 8 bit vertical resolution Analogue to Digital Converter.

The strongest or most intense ions signals resulted from the simultaneous arrival of multiple ion having the same mass to charge ratio from within the isotope cluster. The weakest signals resulted from ions arriving individually at the ion detector.

It is apparent from FIG. 1 that a shift in the level of the baseline is observed after the largest ion arrival event. The shift in the baseline level is due, in part, to AC coupling effects in the ion detector and in the amplification electronics. It is also noted that the DC baseline is also offset above zero level.

Figure 2:
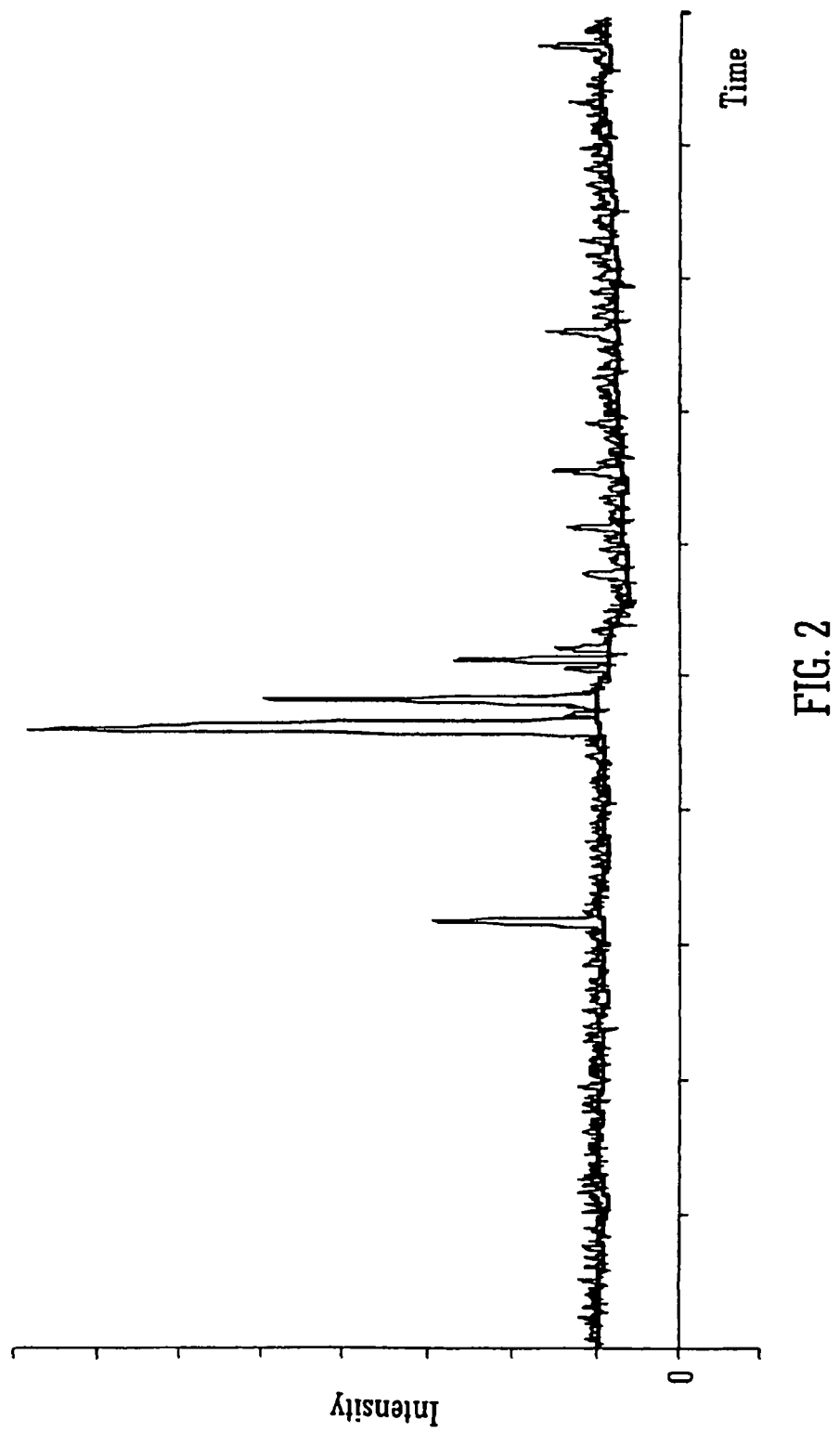
FIG. 2 shows the time of flight spectrum shown in FIG. 1 together with a calculated baseline.

FIG. 2 shows the time of flight data as shown in FIG. 1 together with a superimposed representation of the estimated baseline value across the time of flight spectrum.

Figure 3:
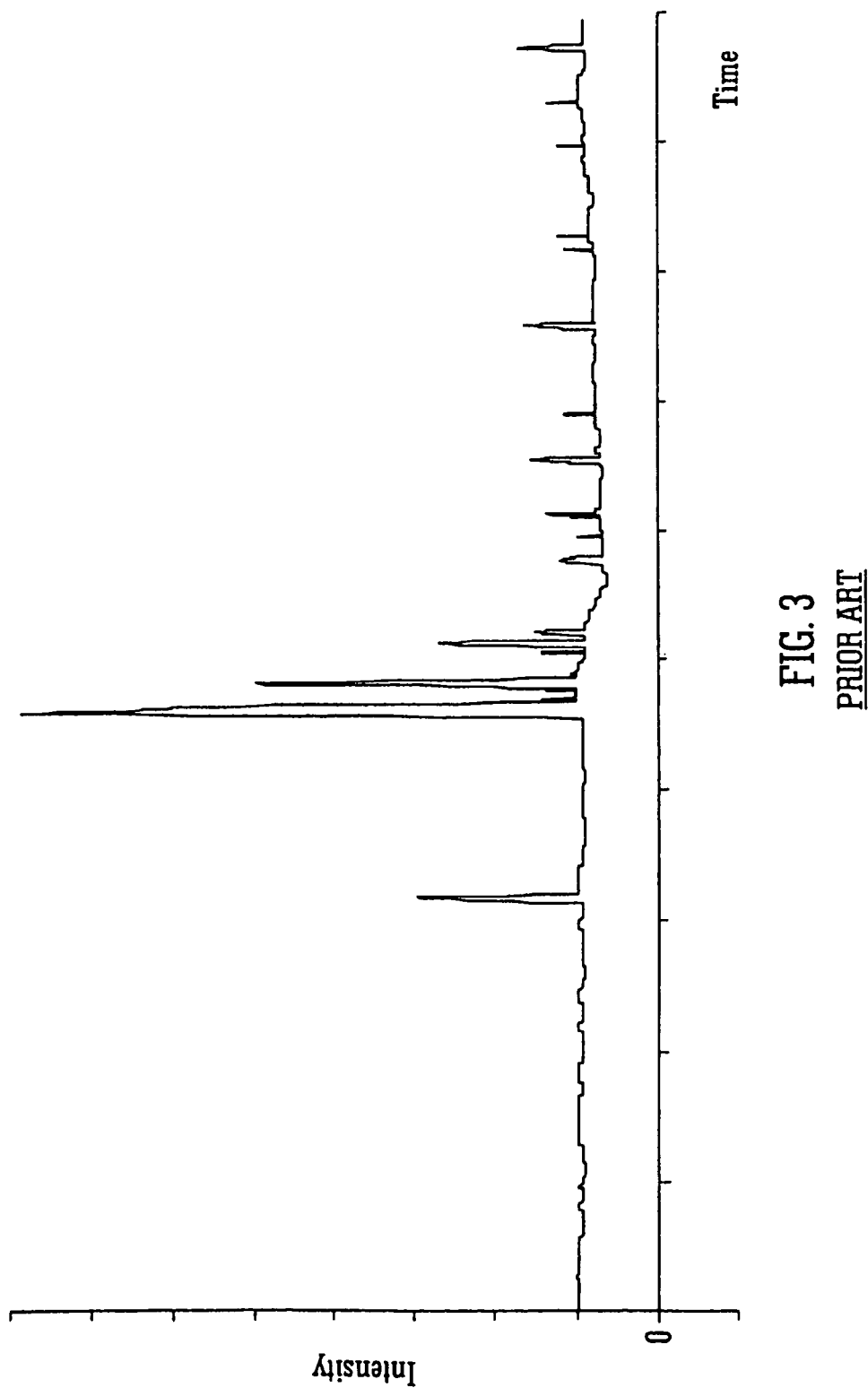
FIG. 3 shows a time of flight spectrum corresponding to the data shown in FIG. 1 after it has been processed in a conventional manner.

FIG. 3 shows the data as shown in FIG. 1 after it has been processed in a conventional manner. After all the data was obtained a baseline value was then calculated from the data. A threshold was applied which was set at a fixed value relative to the calculated baseline. The threshold value was set to be higher than the electronic noise. Data points which were below the threshold value were assigned a value equal to the calculated baseline value. Data points which exceeded the threshold value were left unchanged i.e. they were assigned a value equal to the signal recorded by the Analogue to Digital Converter.

It is clear from FIG. 3 that although the noise in the time of flight spectrum has been reduced, no correction has been made for changes in the baseline level which occur, for example, after relatively intense ion arrival events. The average DC offset associated with the time of flight data also remains unchanged.

Figure 4:
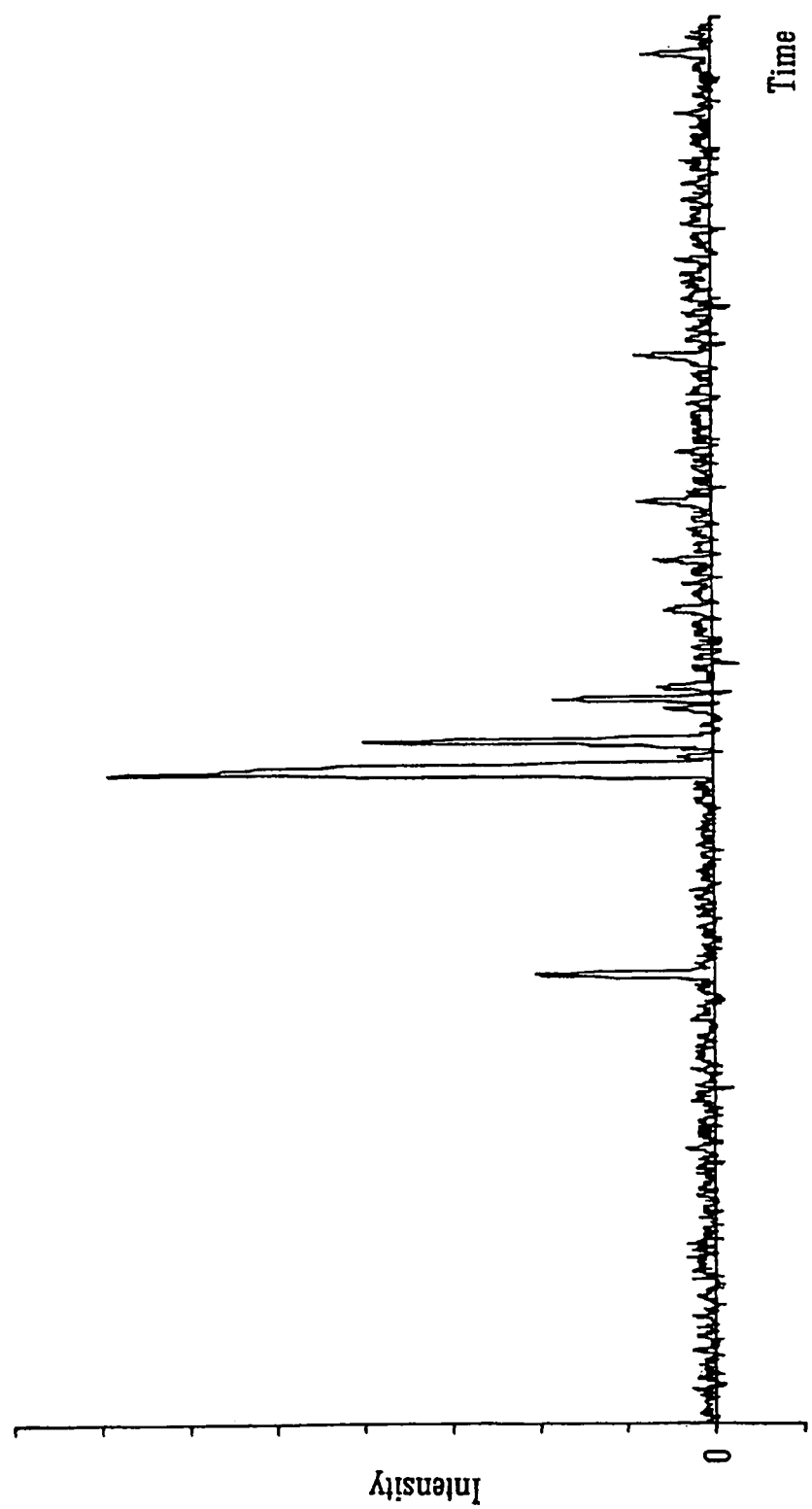
FIG. 4 shows a time of flight spectrum corresponding to the data shown in FIG. 1 as obtained according to an embodiment of the present invention.

FIG. 4 shows a corresponding signal as obtained according to an embodiment of the present invention. According to the preferred embodiment a baseline value was calculated dynamically and was dynamically subtracted from each data point as data was still in the process of being acquired (i.e. not as a post-processing step). A particularly advantageous aspect of the preferred embodiment is that changes in the baseline value due to the arrival of relatively intense ion signals are corrected for as data is actually being acquired. Another equally advantageous feature of the preferred embodiment is that the DC offset associated with the data is dynamically corrected for. After the data has been acquired, the data may then be summed or averaged with subsequent spectra which have been acquired and processed in a similar way. Alternatively, the data may first be subject to further processing prior to summing or averaging spectra.

Figure 5:
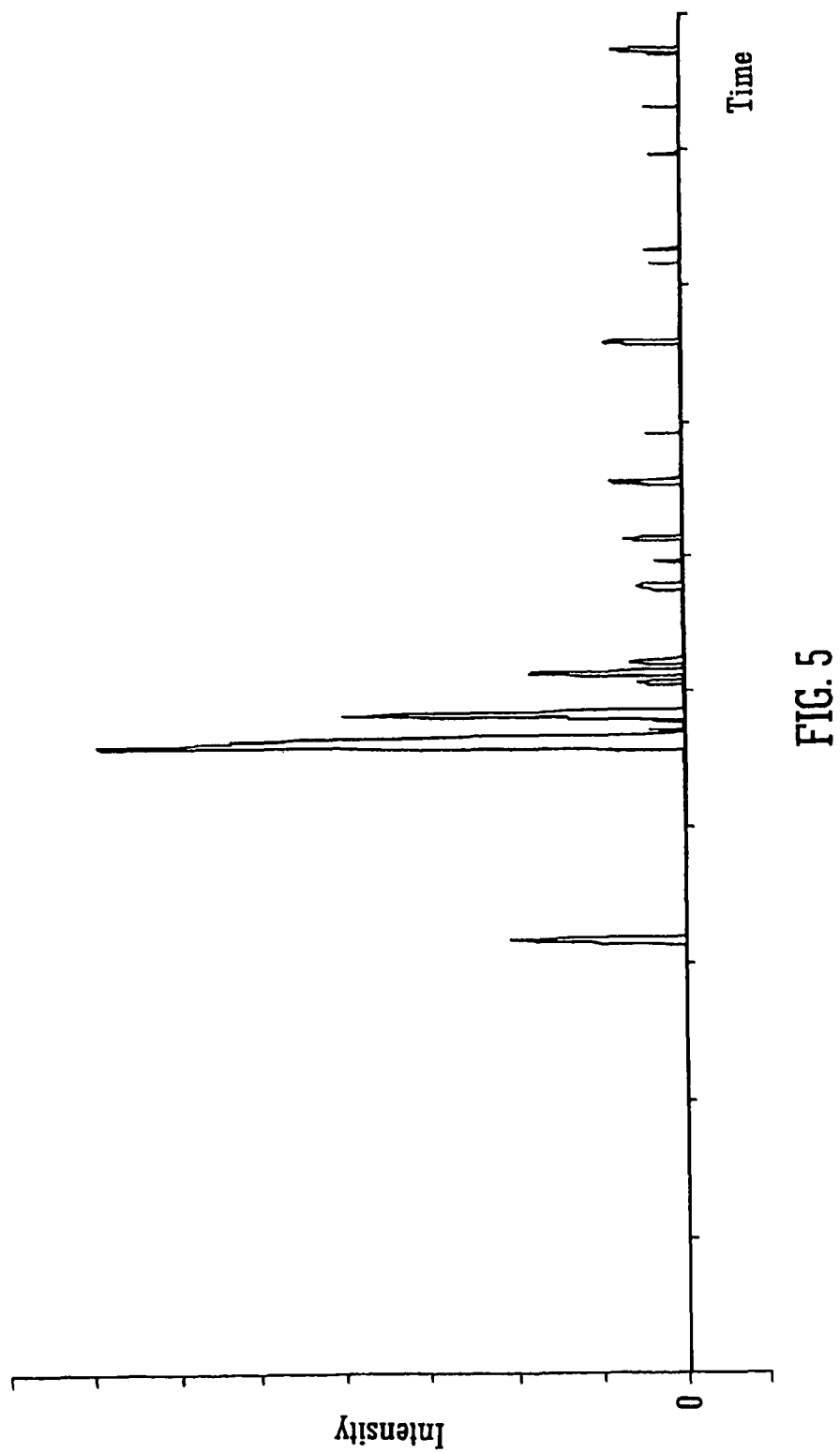
FIG. 5 shows a time of flight spectrum corresponding to the data shown in FIG. 1 after being processed according to an embodiment of the present invention.

FIG. 5 shows the data shown in FIG. 4 after being processed according to a preferred embodiment of the present invention wherein a fixed threshold was applied to the data. Data points which fell below the threshold were set to zero whereas data points which exceeded the threshold were allowed to retain their value i.e. they were assigned a value equal to the signal recorded by the Analogue to Digital Converter after subtraction of the calculated baseline. The application of a threshold decreases the noise in the resulting time of flight spectrum and the variation in the baseline.

The baseline calculation step, the baseline subtraction step and the noise thresholding step (which collectively result in the time of flight spectrum as shown in FIG. 5) may advantageously be performed for each data point as it is being acquired in a substantially simultaneous manner using parallel processors.

The method according to the preferred embodiment may be considered as comprising repetitively determining a value corresponding to the baseline of the output signal and assigning a threshold value for each data point by adding a predefined threshold level to the calculated baseline value for that data point. A value of zero is preferably assigned if the output signal falls below the threshold value. A value corresponding to the output signal minus the calculated baseline value is preferably assigned if the output signal exceeds the threshold value.

According to the preferred embodiment, a fast determination of the median (i.e. 50% percentile) or of another percentile of the data as each data point is determined is preferably made. The median value or other preferred percentile is preferably used as the determined baseline value. This approach preferably has the advantage of being fast and is preferably able to adapt dynamically to any changes in the baseline level.

According to one embodiment two registers may be provided. The first register preferably comprises a baseline value register (BV) and the second register preferably comprises a baseline fraction register (BF). The value in the baseline value register BV is preferably set to a value which preferably comprises an initial estimate of the baseline. The estimate of the baseline may be determined by recording a background spectrum (i.e. without any analyte being present) or by setting the value to an arbitrary or predicted value. The value in the baseline fraction register BF which has a length n is preferably set to n/2.

For the first digitised data point, if the value recorded is greater than the value stored in the baseline value register BV then the value in the baseline fraction register BF is preferably incremented by an integer value A so that the value in the baseline fraction register BF preferably equals n/2+A. However, if the value recorded is less than the value stored in the baseline value register BV, then the value in the baseline fraction register BF is preferably decremented by an integer value B so that the value in the baseline fraction register BF preferably equals n/2−B.

If the value in the baseline fraction register BF is within the range from zero to n (i.e. 0<BF<n) then the value in the baseline value register BV is preferably subtracted from the data point and the value is preferably stored.

If the value in the baseline fraction register BF equals n, then the value in the baseline value register BV is preferably increased by an amount C before being subtracted from the data point and the value is preferably stored. The value in the baseline fraction register BF is then preferably reset to a value equal to n/2 prior to interrogation of the next data point.

If the value in the baseline fraction register BF equals zero then the value in the baseline value register BV is preferably decreased by an amount D before being subtracted from the data point and the value is preferably stored. The value in the baseline fraction register BF is then preferably reset to a value equal to n/2 prior to interrogation of the next data point.

The process is preferably repeated in turn for each data point in the time of flight spectrum as the time of flight spectrum is being acquired.

The approach described above was used to calculate the baseline level which is shown in FIG. 2. In this particular example, n was set at 50, A was set at 8, B was set at 1 and C and D were set to be equivalent to one bit of the eight bit digitiser.

Other less preferred embodiments are contemplated wherein the mass spectrometer may, for example, comprise a quadrupole mass filter, an ion trap or a magnetic sector mass spectrometer.

The value corresponding to the baseline level may be determined using analogue, digital electronics or a combination of both analogue and digital electronics.

The baseline level may be subtracted using analogue electronics, digital electronics or a combination of both analogue and digital electronics.

According to a less preferred embodiment, the signal may be recorded using a Time to Digital Converter (TDC) immediately after background subtraction has been performed. According to this embodiment, the output signal is not digitised using an Analogue to Digital Converter. Instead, the output signal is preferably compared to a reference value which is preferably derived, for example, from a Digital to Analogue Converter (DAC). The output from the comparator which is preferably used to make the comparison may be used to increment or decrement a counter which in turn may then be used to drive the Digital to Analogue Converter providing the reference value. The reference value preferably comprises the determined baseline value and is preferably subtracted from the output signal.

Although the present invention has been described with reference to preferred embodiments, it will be understood by those skilled in the art that various changes in form and detail may be made without departing from the scope of the invention as set forth in the accompanying claims.

The invention claimed is:

1. A method of detecting ions comprising:
digitising a first signal which is being output by an ion detector to produce a plurality of corresponding first signal values;
dynamically determining the baseline level of said first signal by determining a median or other percentile of said first signal values during a prior time period t1; and
dynamically subtracting said baseline level of said first signal from said first signal values to produce a plurality of second signal values.

2. A method as claimed in claim 1, wherein said step of digitising said first signal comprises using an Analogue to Digital Converter (ADC) to digitise said first signal, wherein said Analogue to Digital Converter:
is operated, in use, at a digitisation rate selected from the group consisting of: (i) <1 GHz; (ii) 1-2 GHz; (iii) 2-3 GHz; (iv) 3-4 GHz; (v) 4-5 GHz; (vi) 5-6 GHz; (vii) 6-7 GHz; (viii) 7-8 GHz; (ix) 8-9 GHz; (x) 9-10 GHz; and (xi) >10 GHz.

3. A method as claimed in claim 1, wherein said step of dynamically determining said baseline level of said first signal comprises:
(a) dynamically determining said baseline level during acquisition of mass spectral data; or
(b) dynamically determining said baseline level for a first signal which is being produced due to a group of ions during a time period after said group of ions have been accelerated into a drift region of a Time of Flight mass analyser and prior to all of the ions in said group arriving at an ion detector; or
(c) dynamically determining said baseline level in real-time whilst a set of mass spectral data relating to a group of ions is still being acquired and not as a post-processing step after a set of mass spectral data relating to the group of ions has been fully acquired.

4. A method as claimed in claim 1, wherein said step of determining a median or other percentile of said first signal values comprises determining a percentile of said first signal values during said prior time period t1, wherein said percentile falls within a range selected from the group consisting of: (i) <10%; (ii) 10-20%; (iii) 20-30%; (iv) 30-40%; (v) 40-50%; (vi) 50-60%; (vii) 60-70%; (viii) 70-80%; (ix) 80-90%; and (x) >90%.

5. A method as claimed in claim 1, wherein said step of determining a median or other percentile of said first signal values during a prior time period t1 further comprises determining whether a said first signal value is greater than or less than the current determined median or other percentile of said first signal values, and wherein:
(a) if said first signal value is greater than said current determined median or percentile of said first signal values then a first constant value is added to said current determined median or percentile; and
(b) if said first signal value is less than said current determined median or percentile of said first signal values then a second constant value is subtracted from said current determined median or percentile.

6. A method as claimed in claim 5, wherein said first constant value is one of: (i) substantially the same as; and (ii) substantially different to said second constant value.

7. A method as claimed in claim 1, wherein said step of dynamically determining said baseline level of said first signal comprises providing a first baseline value register and a second baseline fraction register, and wherein:
(a) if a said first signal value is greater than the value stored in said first baseline value register then an integer value is added to the value stored in said second baseline fraction register; and
(b) if a said first signal value is less than the value stored in said first baseline value register then an integer value is subtracted from the value stored in said second baseline fraction register.

8. A method as claimed in claim 1, wherein:
during acquisition of a single set of mass spectral data corresponding to a single group of ions which are accelerated into a drift region of a Time of Flight mass analyser at least x first signal values are obtained over a time period T, wherein x is selected from the group consisting of: (i) <1000; (ii) 1000-5000; (ii) 5000-10000; (iii) 10000-50000; (iv) 50000-100000; (v) 100000-500000; (vi) 500000-1000000; and (vii) >1000000; and
wherein the ratio of said prior time period t1 to said time period T is selected from the group consisting: (i) ≤50%; (ii) ≤10%; (iii) ≤5%; (iv) ≤1; (v) ≤0.5%; (vi) ≤0.1%; (vii) ≤0.05%; (viii) ≤0.01%; (ix) ≤0.005%; (x) ≤0.001%; (xi) ≤0.0005%; (xii) ≤0.0001%; (xiii) ≤0.00005%; and (xiv) ≤0.00001%.

9. A method as claimed in claim 1, wherein:
a single set of mass spectral data corresponding to a single group of ions which are accelerated into a drift region of a Time of Flight mass analyser is acquired over a time period T selected from the group consisting of: (i) <500 ns; (ii) 500-1000 ns; (iii) 1-5 µs; (iv) 5-10 µs; (v) 10-50 µs; (vi) 50-100 µs; (vii) 100-500 µs; (viii) 500-1000 µs; and (ix) >1 ms; and
wherein the ratio of said prior time period t1 to said time period T is selected from the group consisting: (i) ≤50%; (ii) ≤10%; (iii) ≤5%; (iv) ≤1; (v) ≤0.5%; (vi) ≤0.1%; (vii) ≤0.05%; (viii) ≤0.01%; (ix) ≤0.005%; (x) ≤0.001%; (xi) ≤0.0005%; (xii) ≤0.0001%; (xiii) ≤0.00005%; and (xiv) ≤0.00001%.

10. A method as claimed in claim 1, further comprising comparing said second signal values with a threshold value, wherein:
(a) if a said second signal value falls below said threshold value then said second signal value is one of: (i) assigned a value of zero; and (ii) substantially reduced; and
(b) if a said second signal value falls above said threshold value then said second signal value is left substantially unaltered.

11. A method as claimed in claim 10, wherein said step of comparing said second signal values with a threshold value comprises:
(a) dynamically comparing said second signal values with said threshold value during acquisition of mass spectral data; or
(b) dynamically comparing said second signal values with said threshold value wherein said second signal values correspond with a first signal which is being produced due to a group of ions during a time period after said group of ions have been accelerated into a drift region of a Time of Flight mass analyser and prior to all of the ions in said group arriving at an ion detector; or (c) dynamically comparing said second signal values with said threshold value in real-time whilst a set of mass spectral data relating to a group of ions is still being acquired and not as a post-processing step after a set of mass spectral data relating to the group of ions has been fully acquired.

12. A method as claimed in claim 1, wherein said step of digitizing said first signal comprises using an Analog-to-Digital Converter (ADC) to digitize said first signal, wherein said ADC has a resolution selected from the group consisting of: (i) at least 4 bits; (ii) at least 5 bits; (iii) at least 6 bits; (iv) at least 7 bits; (v) at least 8 bits; (vi) at least 9 bits; (vii) at least 10 bits; (viii) at least 11 bits; (ix) at least 12 bits; (x) at least 13 bits; (xi) at least 14 bits; (xii) at least 15 bits; and (xiii) at least 16 bits.

13. A method as claimed in claim 1, wherein said prior time period t1 corresponds to a time during which y first signal values or data values are obtained, wherein y is selected from the group consisting of: (i) <10; (ii) 10-50; (iii) 50-100; (iv) 100-500; (v) 500-1000; (vi) 1000-5000; (vii) 5000-10000; (viii) 10000-50000; and (ix) >50000.

14. A method as claimed in claim 1, wherein said prior time period t1 is selected from the group consisting of: (i) <5 ns; (ii) 5-10 ns; (iii) 10-50 ns; (iv) 50-100 ns; (v) 100-500 ns; (vi) 500-1000 ns; (vii) 1-5 μs; (viii) 5-10 μs; (ix) 10-50 μs; (x) 50-100 μs; (xi) 100-500 μs; (xii) 500-1000 μs; and (xiii) >1 ms.

15. A method of mass spectrometry comprising a method of detecting ions including:

digitizing a first signal which is being output by an ion detector to produce a plurality of corresponding first signal values;

dynamically determining the baseline level of said first signal by determining a median or other percentile of said first signal values during a prior time period t1; and dynamically subtracting said baseline level of said first signal from said first signal values to produce a plurality of second signal values.

16. An ion detector system comprising:

a device arranged and adapted to digitise a first signal which is being output by an ion detector to produce a plurality of corresponding first signal values;

a device arranged and adapted to dynamically determine the baseline level of said first signal by determining a median or other percentile of said first signal values during a prior time period t1; and a device arranged and adapted to dynamically subtract said baseline level of said first signal from said first signal values to produce a plurality of second signal values.

17. An ion detector system as claimed in claim 16, wherein the ion detector system is a portion of a mass spectrometer, and the mass spectrometer further comprises at least one of:

(a) an ion source arranged upstream of said ion detector system, wherein said ion source is selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ('7 FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; and (xviii) a Thermospray ion source;

(b) one or more ion guides arranged upstream of said ion detector system;

(c) one or more ion mobility separation devices arranged upstream of said ion detector system;

(d) one or more Field Asymmetric Ion Mobility Spectrometer devices arranged upstream of said ion detector system;

(e) one or more ion traps arranged upstream of said ion detector system;

(f) one or more devices arranged upstream of said ion detector system, wherein said one or more devices are selected from the group consisting of: (i) a Collisional Induced Dissociation ("CID") fragmentation device; (ii) a Surface Induced Dissociation ("SID") fragmentation device; (iii) an Electron Transfer Dissociation fragmentation device; (iv) an Electron Capture Dissociation fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an ion-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; and (xxviii) an ion-metastable atom reaction device for reacting ions to form adduct or product ions; and (g) a mass analyser selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic or orbitrap mass analyser; (x) a Fourier Transform electrostatic or orbitrap mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser.

18. A method of mass spectrometry comprising:

dynamically determining a median or other percentile of a first signal output from an ion detector over a prior time period;

dynamically subtracting said median or other percentile from said first signal to generate a second signal; and dynamically applying a threshold to said second signal and setting second signal values to zero if said second signal does not substantially exceed said threshold.em

\* \* \* \* \*

UNITED STATES PATENT AND TRADEMARK OFFICE
CERTIFICATE OF CORRECTION

| | | |
|---|---|---|
| PATENT NO. | : 8,598,513 B2 | Page 1 of 1 |
| APPLICATION NO. | : 12/600209 | |
| DATED | : December 3, 2013 | |
| INVENTOR(S) | : Gilbert et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1052 days.

Signed and Sealed this
Nineteenth Day of April, 2016

Michelle K. Lee
*Director of the United States Patent and Trademark Office*